Figure 1:
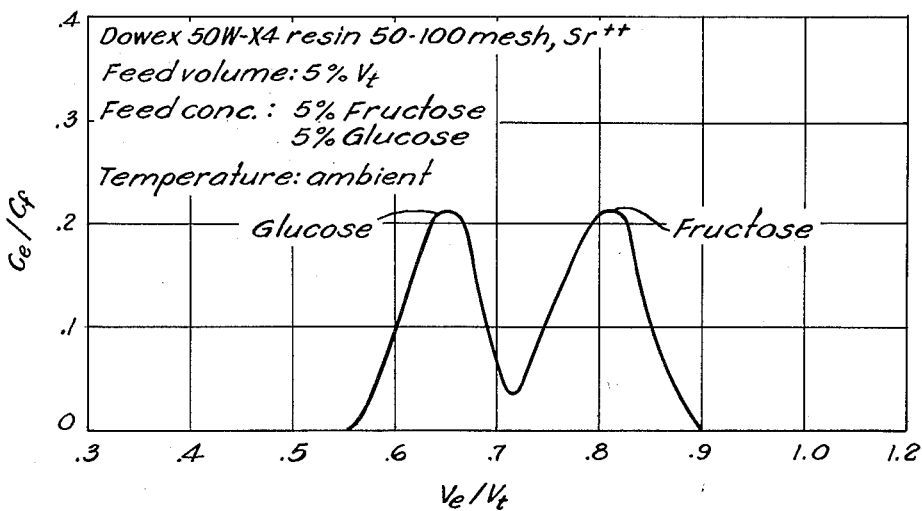

INVENTOR.
Leonard J. Lefevre

3,044,905
SEPARATION OF FRUCTOSE FROM GLUCOSE USING CATION EXCHANGE RESIN SALTS

Leonard J. Lefevre, Midland, Mich., assignor to The Dow Chemical Company, Midland, Mich., a corporation of Delaware
Filed Feb. 15, 1960, Ser. No. 8,605
6 Claims. (Cl. 127—46)

This invention concerns an improved method for separating fructose from glucose wherein certain cation exchange resin salts are used as separating media.

Until the present invention, it was never thought possible to separate sugars which are functional isomers by means of salts of cation exchange resins as selective absorbents. This was because such molecules are non-ionic in nature and have the same molecular weight. Furthermore, it was not apparent from the knowledge of ion exclusion techniques that such a separation would be feasible.

Pursuant to this invention, it has been discovered that fructose can be separated from its aqueous solutions also containing glucose by contacting an aqueous solution of fructose and glucose with a barium or strontium salt of a strongly acid nuclearly-sulfonated styrene-type cation exchange resin. The fructose and glucose are thereby retained by the resin, the fructose being held more firmly than the glucose. Thereafter, a water wash, advantageously distilled or deionized water, is used to elute first the glucose which is more loosely retained by the resin, then the fructose which is more firmly retained by the resin.

Aqueous solutions of fructose and glucose which can be separated into fructose and glucose fractions by the process of this invention advantageously contain from about 10 to about 40 weight percent of total sugars. The solutions of sugars to be separated need not contain fructose and glucose only. Advantageously, commercial aqueous solutions obtained by inverting sucrose and containing fructose, glucose and sucrose are separated into a glucose-sucrose fraction, the sucrose being eluted together with the glucose, and a fructose fraction. The eluted sucrose can be inverted and the resulting fructose and glucose recycled for further separation.

The barium and strontium salts of strongly acid nuclearly-sulfonated cation exchange resins used in the practice of this invention are those having an at least slightly cross-linked vinylaromatic resin matrix. They are nuclearly sulfonated polymers or coplymers of vinylaromatic compounds, such as styrene, ar-vinyltoluene, ar-vinylxylene, etc., that have been cross-linked in molecular structure to an extent rendering the sulfonated polymers and copolymers insoluble in aqueous solutions of acids, bases, or salts. They may be cross-linked in any of a number of known ways. For instance, polystyrene granules can be given a cross-linked molecular structure by being subjected to an electron bombardment to render them cross-linked and insoluble and can thereafter be sulfonated and be converted to the strontium or barium salt to obtain a suitable cation exchange resin salt. The cross-linking is usually acomplished by copolymerizing a major amount of one or more monovinylaromatic compounds with a minor proportion, e.g., from about 0.5 to 20 weight percent of a polyethylenically unsaturated organic cross-linking agent, e.g., divinylbenzene, divinyltoluenes, divinylnapthalenes, diallyl esters, doubly-unsaturated esters such as ethylene glycol diacrylate and ethylene glycol dimethylacrylate, etc., and the resulting cross-linked copolymers are sulfonated. These and other ways of making sulfonated, cross-linked vinylaromatic polymeric products having ion exchange properties are known in the art. For convenience, such insoluble, sulfonated, cross-linked vinylaromatic resins, having cation-exchanging properties, will hereinafter be referred to generically as "nuclearly-sulfonated styrene cation exchange resins." The strontium and/or barium salts of nuclearly-sulfonated copolymers of from 98 to 80 weight percent of styrene, or a mixture of styrene and ethylvinylbenzene, and from 2 to 20 (usually from 1 to 12) weight percent of divinylbenzene, are preferably employed in the process of the invention.

The temperatures used in the separation are not critical, and may be varied within a range advantageously of from about 20° to about 80° C. The preferred temperature range is from about 30° to about 50° C.

In practice, an aqueous solution of fructose and glucose is contacted wtih a barium or strontium salt of a nuclearly-sulfonated styrene cation exchange resin, advantageously by feeding the sugar solution to a water-immersed bed of the cation exchange resin salt, whereby the resin is loaded with fructose and glucose, the glucose is removed by washing the loaded resin with a first water wash and thereafter the fructose is removed by a second water wash. These two washes can be accomplished by a single passage of water through a bed of the resin, in which case a solution of the glucose, or glucose together with sucrose, is obtained as an early fraction of the resulting eluate and a solution of fructose is obtained as a subsequent fraction of the eluate. In some instances, an intervening eluate fraction containing both glucose and fructose is also obtained. In such instances, the intervening fraction can be returned to the ion exchange resin bed in a subsequent operating cycle of the process. After the ion exchange resin bed has been eluted with water, it is in condition for reemployment in the process. The operating cycle just described may be, and usually is, repeated many times, fresh portions of the starting solution comprising fructose and glucose being fed to the bed in successive cycles. In case part of the strontium or barium initially present in the ion exchange resin becomes displaced by other ions present in the starting solution of the sugars during prolonged practice of the process, the process may be interrupted occasionally and the resin be reloaded wtih strontium and/or barium ions, e.g., by a conventional ion exchange operation such as treatment of the resin with an aqueous solution of an ionizable strontium or barium salt, e.g., $SrCl_2$, $SrBr_2$, $Sr(NO_3)_2$, $BaCl_2$, $BaBr_2$, or $Ba(NO_3)_2$, etc.

The process of this invention makes possible the complete separation of fructose from an aqueous solution of fructose and glucose and the complete separation of fructose from an aqueous solution of fructose, glucose and sucrose. Overall yields of 90 percent and higher are attainable, theoretical fructose basis.

The process can advantageously be carried out in a continuous, or pseudo-continuous, manner utilizing a Higgins contactor (Higgins and Roberts, "A Countercurrent Solid-Liquid Contactor for Continuous Ion Exchange," Chemical Engineering Progress Symposium Series, No. 14, volume 50, 1954, pages 87–92 and U.S. Patent 2,815,322), in which case cyclic loading and eluting procedures or batch process loading and eluting procedures may be used. In either of the above-mentioned procedures, depending upon the temperatures, concentrations and viscosities of the sugar solutions, the feed flow and elution rates are varied as desired, advantageously between about 0.05–0.5 g.p.m./ft.$^2$, largely dictated by economic considerations. A simple test suffices to determine the adequacy of a proposed feed flow or elution rate. Effluent and eluate concentrations and changes therein are advantageously determined and followed by refractive index measurements.

The following descriptive examples are given in illustration and not in limitation of the invention.

EXAMPLE 1

Figure 2:
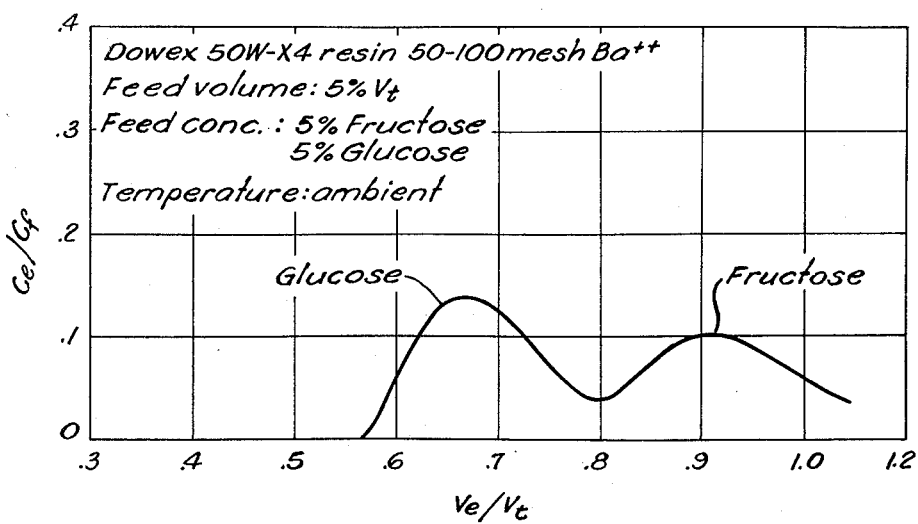

Fructose was separated from glucose on columns of the strontium and barium forms of cation exchange resin, Dowex 50W–X4 type, 50–100 mesh, a sulfonated copolymer of 92 weight percent styrene, 4 percent ethylvinylbenzene and 4 percent divinylbenzene, at a bed depth of four feet, a flow rate of 0.1 g.p.m./ft.$^2$ of column cross section, a feed-liquor loading of 5 percent of bed volume and at solution concentrations of 5 weight percent fructose and 5 weight percent glucose. This was accomplished by passing an aqueous solution of the sugars downflow through a water-immersed bed of the cation exchange resin in the indicated salt forms to displace a corresponding volume of effluent liquor and thereafter eluting absorbed sugars with water. Successive eluate fractions containing glucose and fructose, respectively, were collected and analyzed. Table I is a listing of the data points for these separations on the strontium and barium forms of the ion exchange resin. These data are graphed as FIGURES 1 and 2, respectively.

*Table I*

| Strontium form resin | | Barium form resin | |
|---|---|---|---|
| Ve/Vt [1] | Ce/Cf [2] | Ve/Vt | Ce/Cf |
| .533 (g.[3]) | 0 | .533 | 0 |
| .571 | .011 | .571 | 0 |
| .607 | .138 | .607 | .069 |
| .643 | .213 | .643 | .128 |
| .663 | .202 | .680 | .128 |
| .680 | .138 | .717 | .117 |
| .700 | .064 | .753 | .064 |
| .717 | .032 | .790 | .043 |
| .737 | .064 | .827 | .053 |
| .753 | .128 | .864 | .074 |
| .790 | .202 | .902 | .096 |
| .810 (f.[4]) | .213 | .938 | .096 |
| .827 | .192 | .975 | .069 |
| .864 | .064 | 1.01 | 0.053 |
| .902 | 0 | 1.05 | 0.032 |

[1] Ve/Vt = Vol. of eluate/vol. of resin.
[2] Ce/Cf = Conc. of eluate/Conc. of feed (weight percent).
[3] Glucose fraction.
[4] Fructose fraction.

The following Examples 2–7 used the strontium form of nuclearly sulfonated styrene cation exchange resin. However, the effects of variation of each of the conditions outlined are equally as applicable to the barium form of the resin.

EXAMPLE 2

The effect of varying the cross-linkage of the resin is shown in Table II. The conditions of operation other than the resin cross-linkage were the same as those used in Example 1.

*Table II*

| 2% DVB [1] | | 4% DVB | | 8% DVB | |
|---|---|---|---|---|---|
| Ve/Vt | Ce/Cf | Ve/Vt | Ce/Cf | Ve/Vt | Ce/Cf |
| .607 | 0 | .533 | 0 | .460 | 0 |
| .643 | .085 | .571 | .011 | .497 | .064 |
| .680 | .192 | .607 | .138 | .533 | .138 |
| .717 | .202 | .643 | .213 | .571 | .138 |
| .753 | .117 | .680 | .138 | .607 | .117 |
| .790 | .064 | .717 | .032 | .643 | .085 |
| .827 | .128 | .753 | .128 | .680 | .074 |
| .864 | .170 | .790 | .202 | .717 | .096 |
| .902 | .149 | .810 | .213 | .753 | .117 |
| .938 | .085 | .827 | .192 | .790 | .074 |
| .975 | .032 | .864 | .064 | .827 | .064 |
| 1.01 | 0 | .902 | 0 | .864 | .032 |
| | | | | .902 | .021 |
| | | | | .938 | 0 |

[1] DVB = Divinylbenzene.

Cross-linkages below 1% divinylbenzene are less desirable since the resin beads at these cross-linkages tend to be "mushy." Cross-linkages above 12% divinylbenzene give slower diffusion rates of the sugars into the resin beads.

EXAMPLE 3

The effect of varying the temperature of operation is shown in Table III. The other conditions of operation were the same as outlined in Example 1.

*Table III*

| Ambient Temperature | | 50° C. | | 80° C. | |
|---|---|---|---|---|---|
| Ve/Vt | Ce/Cf | Ve/Vt | Ce/Cf | Ve/Vt | Ce/Cf |
| .533 | 0 | .571 | 0 | .534 | 0 |
| .571 | .011 | .607 | .053 | .571 | .096 |
| .607 | .138 | .643 | .210 | .607 | .202 |
| .643 | .213 | .680 | .242 | .643 | .213 |
| .663 | .202 | .717 | .084 | 680 | .213 |
| .680 | .138 | .753 | .101 | .717 | .224 |
| .700 | .064 | .790 | .210 | .753 | .202 |
| .717 | .032 | .827 | .210 | .790 | .064 |
| .737 | .064 | .864 | .074 | .827 | 0 |
| .753 | .128 | .902 | 0 | | |
| .790 | .202 | | | | |
| .810 | .213 | | | | |
| .27 | .192 | | | | |
| .864 | .064 | | | | |
| .902 | 0 | | | | |

EXAMPLE 4

The effect of varying the feed flow rate is shown in Table IV. The conditions of operation in this case include use of a four feet deep resin bed, ambient temperature, a feed loading equal to 15% of the bed volume, feed concentration of 10% fructose and 10% glucose, and the strontium form of Dowex 50W–X4 cation exchange resin, 50–100 mesh.

*Table IV*

| 0.1 g.p.m./ft.$^2$ | | 0.31 g.p.m./ft.$^2$ | |
|---|---|---|---|
| Ve/Vt | Ce/Cf | Ve/Vt | Ce/Cf |
| .534 | 0 | .496 | 0 |
| .571 | .058 | .534 | .039 |
| .607 | .199 | .571 | .135 |
| .643 | .356 | .607 | .261 |
| .680 | .450 | .643 | .353 |
| .717 | .456 | .680 | .391 |
| .753 | .366 | .717 | .401 |
| .790 | .320 | .753 | .386 |
| .827 | .387 | .790 | .358 |
| .864 | .440 | .827 | .324 |
| .902 | .424 | .864 | .290 |
| .938 | .320 | .902 | .227 |
| .975 | .188 | .938 | .174 |
| 1.01 | .079 | .975 | .121 |
| 1.05 | .026 | 1.01 | .063 |
| 1.09 | 0 | 1.05 | .034 |
| | | 1.09 | .019 |
| | | 1.12 | 0 |

For the operating conditions outlined for Table IV, the most desirable feed flow rate was 0.1 g.p.m./ft.$^2$. While lower feed loadings or feed concentrations can be used, the preferred feed flow rate range was from 0.1 to 0.25 g.p.m./ft.$^2$. These flow rates should not be considered as limiting for the entire range, however. Lower flow rates can be used but are generally economically disadvantageous. Higher flow rates can be used but would require excessive amounts of recycle to obtain a relatively pure product.

EXAMPLE 5

The effect of varying the bed depth is shown in Table V. Other operating conditions were the same as outlined in Example 1.

Table V

| 2 foot deep bed | | 4 foot deep bed | | 6 foot deep bed | |
|---|---|---|---|---|---|
| Ve/Vt | Ce/Cf | Ve/Vt | Ce/Cf | Ve/Vt | Ce/Cf |
| .578 | 0 | .533 | 0 | .538 | 0 |
| .610 | .041 | .571 | .011 | .562 | .062 |
| .641 | .093 | .607 | .138 | .587 | .206 |
| .672 | .134 | .643 | .213 | .612 | .278 |
| .703 | .144 | .663 | .202 | .637 | .248 |
| .734 | .134 | .680 | .138 | .662 | .093 |
| .766 | .113 | .700 | .064 | .687 | .021 |
| .796 | .082 | .717 | .032 | .712 | 0 |
| .828 | .093 | .737 | .064 | .737 | .051 |
| .859 | .113 | .753 | .128 | .762 | .134 |
| .891 | .124 | .790 | .202 | .788 | .206 |
| .921 | .113 | .810 | .213 | .812 | .227 |
| .953 | .093 | .827 | .192 | .838 | .165 |
| .985 | .062 | .864 | .064 | .864 | .093 |
| 1.01 | .041 | .902 | 0 | .886 | .031 |
| | | | | .913 | 0 |

These data indicate that the optimum bed depth is more closely controlled by equipment design than by the separation data. All the bed depths tested were acceptable.

EXAMPLE 6

The effect of feed concentration is shown in Table VI. The other conditions of operation were the same as given in Example 1, except that the bed loading was increased from 5% of bed volume to 15% of bed volume.

Table VI

| 5% Fructose—5% Glucose | | 10% Fructose—10% Glucose | | 15% Fructose—15% Glucose | |
|---|---|---|---|---|---|
| Ve/Vt | Ce/Cf | Ve/Vt | Ce/Cf | Ve/Vt | Ce/Cf |
| .534 | 0 | .534 | 0 | .534 | 0 |
| .571 | .064 | .571 | .058 | .571 | .041 |
| .607 | .202 | .607 | .199 | .607 | .148 |
| .643 | .351 | .643 | .356 | .643 | .296 |
| .680 | .426 | .680 | .450 | .680 | .401 |
| .717 | .436 | .717 | .456 | .717 | .423 |
| .753 | .351 | .753 | .366 | .753 | .398 |
| .790 | .276 | .790 | .320 | .790 | .353 |
| .827 | .351 | .827 | .387 | .827 | .388 |
| .864 | .415 | .864 | .440 | .864 | .417 |
| .902 | .426 | .902 | .424 | .902 | .401 |
| .938 | .351 | .938 | .320 | .938 | .318 |
| .975 | .213 | .975 | .188 | .975 | .214 |
| 1.01 | .085 | 1.01 | .079 | 1.01 | .117 |
| 1.05 | .011 | 1.05 | .026 | 1.05 | .047 |
| 1.09 | 0 | 1.09 | 0 | 1.09 | .013 |

The preferred feed concentration for the given conditions was 20% total sugars. However, both higher and lower feed concentrations can be used if the appropriate recycle system is employed.

EXAMPLE 7

The effect of feed loading (vol. of feed per cycle as percent of bed volume) is shown in Table VII. The other conditions were the same as in Example 1.

Table VII

| 5% of bed volume | | 15% of bed volume | | 25% of bed volume | |
|---|---|---|---|---|---|
| Ve/Vt | Ce/Cf | Ve/Vt | Ce/Cf | Ve/Vt | Ce/Cf |
| .534 | 0 | .534 | 0 | .571 | 0 |
| .571 | .011 | .571 | .064 | .607 | .070 |
| .607 | .138 | .607 | .202 | .643 | .228 |
| .643 | .213 | .643 | .351 | .680 | .351 |
| .663 | .202 | .680 | .426 | .717 | .412 |
| .680 | .138 | .717 | .436 | .753 | .465 |
| .700 | .064 | .753 | .351 | .790 | .517 |
| .717 | .032 | .790 | .276 | .827 | .588 |
| .737 | .064 | .827 | .351 | .864 | .570 |
| .753 | .128 | .864 | .415 | .902 | .527 |
| .790 | .202 | .902 | .426 | .938 | .474 |
| .810 | .213 | .938 | .351 | .975 | .456 |
| .827 | .192 | .975 | .213 | 1.01 | .404 |
| .864 | .064 | 1.01 | .085 | 1.05 | .307 |
| .902 | 0 | 1.05 | .011 | 1.09 | .202 |
| | | 1.09 | 0 | 1.12 | .097 |
| | | | | 1.16 | .035 |
| | | | | 1.20 | 0 |

The preferred bed loading under operating conditions was 15% of bed volume when using the feed solution employed above. Preferred bed loading will vary, of course, with feed concentration and flow rate. With the feed loadings at 15 and 25% of bed volume, eluate fractions both of glucose and fructose were obtained, as well as an intermediate eluate fraction containing both glucose and fructose. The mixed fractions were recycled.

EXAMPLE 8

Fructose was separated from glucose and sucrose under conditions of operation as outlined in Example 1. The following data were obtained in a run which differed from that outlined for Example 1 in that the feed concentration was 10% sucrose, 5% glucose and 5% fructose, rather than 5% fructose and 5% glucose. Ce/Cf was based on total sugar content of the feed.

| Ve/Vt | Ce/Cf |
|---|---|
| g. and s [1] .460 | 0 |
| .496 | .057 |
| .534 | .176 |
| .571 | .238 |
| .607 | .228 |
| .643 | .187 |
| .680 | .103 |
| .717 | .036 |
| .753 | .031 |
| f .790 | .057 |
| .827 | .083 |
| .864 | .067 |
| .902 | .047 |
| .938 | .016 |
| .975 | 0 |

[1] Sucrose.

I claim:

1. A method for separating fructose from an aqueous solution of fructose and glucose which comprises contacting said aqueous solution with a member of the group consisting of the barium and strontium salts of a nuclearly-sulfonated styrene cation exchange resin crosslinked in molecular structure to an extent rendering the sulfonated resin insoluble in aqueous solutions of acids, bases and salts whereby fructose and glcose are absorbed by said cation exchange resin salt, separating the loaded resin from the remaining aqueous solution and eluting said loaded resin with water to remove the glucose and fructose in successive fractions of eluate.

2. The method of claim 1 wherein the total sugar concentration of the feed solution is between about 10 and about 40 weight percent.

3. The method of claim 1 wherein the nuclearly-sulfonated styrene cation exchange resin salt is that of a copolymer of a preponderance of styrene and from about 0.5 to about 15 weight percent of divinylbenzene.

4. A method for separating fructose from an aqueous solution of fructose, glucose and sucrose which comprises contacting said aqueous solution with a member of the group consisting of the barium and strontium salts of a nuclearly-sulfonated styrene cation exchange resin crosslinked in molecular structure to an extent rendering the sulfonated resin insoluble in aqueous solutions of acids, bases and salts whereby fructose, glucose and sucrose are absorbed by said cation exchange resin salt, separating the thereby loaded resin from the remaining aqueous solution and eluting said loaded resin with water to remove the glucose and sucrose in one fraction of the eluate and the fructose in another fraction of the eluate.

5. A method for separating fructose from an aqueous solution of fructose and glucose, the total sugar concentration of which is between about 10 and about 40 weight percent, which comprises feeding such solution to a water-immersed column of a member of the group consisting of the barium and strontium salts of a nuclearly-sulfonated styrene cation exchange resin crosslinked in molecular structure to an extent rendering the sulfonated resin insoluble in aqueous solutions of acids, bases and salts whereby the water of the water-immersed resin is displaced by a corresponding volume of said sugar solution and whereby the resin column is loaded with glucose and fructose, and eluting said loaded resin column with water to displace eluate fractions of glucose and fructose, respectively.

6. A method for separating fructose from an aqueous solution of fructose, glucose, and sucrose, the total sugar concentration of which is between about 10 and about 40 weight percent, which comprises feeding such solution to a water-immersed column of a member of the group consisting of the barium and strontium salts of a nuclearly-sulfonated styrene cation exchange resin crosslinked in molecular structure to an extent rendering the sulfonated resin insoluble in aqueous solutions of acids, bases and salts whereby the water of the water-immersed resin is displaced by a corresponding volume of said sugar solution and whereby the resin column is loaded with fructose, glucose, and sucrose, and eluting said loaded resin column with water to displace an eluate fraction of both glucose and sucrose and an eluate fraction of fructose.

References Cited in the file of this patent

UNITED STATES PATENTS 2,868,677    Kopke _____ Jan. 13, 1959
2,890,972    Wheaton _____ June 16, 1959

OTHER REFERENCES

Synthetic Ion Exchangers, by Osborn, 1955, pp. 53–63.

Ion Exchangers in Organic and Biochemistry, by Colman and Kressman, Interscience Publishers, Inc., New York, N.Y., 1957, pp. 178–187.

Ion Exchanger Resins, by Kunn, John Wiley & Sons, Inc., New York, N.Y., 2nd Ed., 1958, pp. 298–300.